United States Patent
Kreuter

(10) Patent No.: US 6,422,184 B1
(45) Date of Patent: Jul. 23, 2002

(54) METHOD AND APPARATUS FOR IMPULSE CHARGING OF AN INTERNAL COMBUSTION ENGINE

(75) Inventor: Peter Kreuter, Aachen (DE)

(73) Assignee: Meta Motoren-und Energie Technik GmbH (DE)

( * ) Notice: Subject to any disclaimer, the term of this patent is extended or adjusted under 35 U.S.C. 154(b) by 0 days.

(21) Appl. No.: 09/512,958

(22) Filed: Feb. 25, 2000

(30) Foreign Application Priority Data

Feb. 26, 1999 (DE) .......................................... 199 08 435

(51) Int. Cl.$^7$ ................................................ F02B 33/04
(52) U.S. Cl. .................................. 123/73 V; 123/184.54
(58) Field of Search ............................. 123/65 V, 51 B, 123/65 VB, 73 V, 73 A, 73 AA, 73 AB, 73 AV, 184.54

(56) References Cited

U.S. PATENT DOCUMENTS

| | | | | |
|---|---|---|---|---|
| 4,254,745 A | * | 3/1981 | Noguchi et al. | 123/51 B |
| 4,356,798 A | * | 11/1982 | Sakaoka et al. | 123/52 MF |
| 4,920,932 A | * | 5/1990 | Schlunke et al. | 123/65 PE |
| 5,033,419 A | * | 7/1991 | Plohberger et al. | 123/73 V |
| 5,390,633 A | * | 2/1995 | Taue | 123/65 V |
| 5,921,208 A | * | 7/1999 | Paszkowska | 123/73 V |

* cited by examiner

Primary Examiner—Willis R. Wolfe
Assistant Examiner—Jason Benton
(74) Attorney, Agent, or Firm—R W Becker & Associates; R W Becker

(57) ABSTRACT

A method and apparatus are provided for impulse charging an internal combustion engine having at least one cylinder in which a piston moves in a stroke movement. The apparatus includes a selectively energizeable magnetic surface disposed in a charging duct of the engine and a closure element disposed in the charging duct relative to the selectively energizeable magnetic surface. Upon energization of the magnetic surface, the closure element is moved from an open position in which a cross section of the charging duct is available for flow therethrough toward the cylinder to a closed position in which the energized magnetic surface retains the closure element by magnetic force at a disposition in which the closure element reduces the cross section of the charging duct in a manner which substantially prevents the flow of fluid therethrough toward the cylinder. The closure element can be retained in its closed position during at least the initial intake movement of the piston in the cylinder such that an underpressure is created downstream of the closure element relative to the direction of fluid flow from the charging duct to the cylinder and, during this period of the underpressure, the closure element can be released to move from its closed position to its open position by de-energization of the magnetic surface. The movement of the closure element is facilitated by the underpressure and the upstream force of the fluid flow against the closure element which increases in correspondence with the increasingly available larger cross section of the charging duct.

15 Claims, 2 Drawing Sheets

METHOD AND APPARATUS FOR IMPULSE CHARGING OF AN INTERNAL COMBUSTION ENGINE

BACKGROUND OF THE INVENTION

The invention relates to a method and apparatus for impulse charging of an internal combustion engine.

An important reason for charging a combustion engine is that a given performance or a given torque can be produced with a relatively smaller engine than otherwise would be required, thus yielding advantages in weight, space, and usage considerations. A further advantage is that the charging offers an additional parameter for influencing the charging preparation and the combustion process, whereby the thermodynamic efficiency and/or the carbon monoxide content in the exhaust can be advantageously influenced.

In practice, exhaust gas turbo charging has been effected by means of a mechanical charger driven by a crankshaft. There have regularly been efforts to develop a so-called impulse charging by which a flow regulating piece, disposed within an inlet duct upstream of the inlet valve, is cyclically closed such that, during the intake movement of the piston with an open inlet valve downstream of the flow regulating piece, an underpressure is produced. If the flow regulating piece is then moved into its open position as the underpressure is produced, the underpressure acts to accelerate the released charging load, which thereupon flows with a high impulse into the combustion chamber to therein effect a large loading. Rotary cam pushers, linearly movable pushers, and similar structures have been used as the flow regulating piece which cyclically closes the inlet duct but such structures have required exterior drive means to effect their movement as well as a relatively long window of time to effect complete opening of the inlet duct, whereby the efficiency of the impulse charging has been detrimentally influenced.

SUMMARY OF THE INVENTION

An object of the present invention is to provide a method and apparatus for impulse charging of an internal combustion engine which achieve a highly efficient impulse charging through simple operation and reduced energy consumption.

Another object of the present invention is to provide a method and apparatus for impulse charging of an internal combustion engine which uses the energy of the charging flow itself to facilitate the movement of the flow resistance element into its open position in which it permits the full cross section of the inlet duct to be available for flow. This is advantageous in that the movement of the flow resistance element can, on the one hand, be effected in a relatively rapid movement and, on the other hand, only a relatively small amount of additional external energy is required. These advantages raise the efficiency of the impulse charging.

In accordance with the present invention, the foregoing and other objects are attained by a method and an apparatus which comprise disposing a flap as a flow resistance element in an inlet duct which is relatively rapidly movable to permit a heretofore not attained quick availability of the full cross section of the inlet duct for flow of the charging load therethrough, whereby this capability to provide the quick availability of the inlet duct for flow permits effective utilization of the pre-opening underpressure to create an impulse charging. The full cross section of the inlet duct, which is made available for flow due to the precipitous movement of the flap, ensures that there is only relatively little loss of flow. The method and apparatus of the present invention provide a magnetic surface disposed in the inlet duct which is selectively energizeable to retain the flap in its closed position and means for resiliently biasing the flap into its closed position so as to advantageously minimize the energy required to energize the magnetic surface.

The method and apparatus of the present invention are suitable for inlet ducts as well as exhaust ducts of internal combustion engines which may be configured as Otto-cycle engines as diesel engines and which may operate as two- or four-cycle engines. The mixture preparation can be effected through induced injection, direct injection or other injection methods.

Further objects, features, and advantages of the invention will be apparent from the following description of a preferred embodiment.

DESCRIPTION OF THE PREFERRED EMBODIMENT

Figure 1:
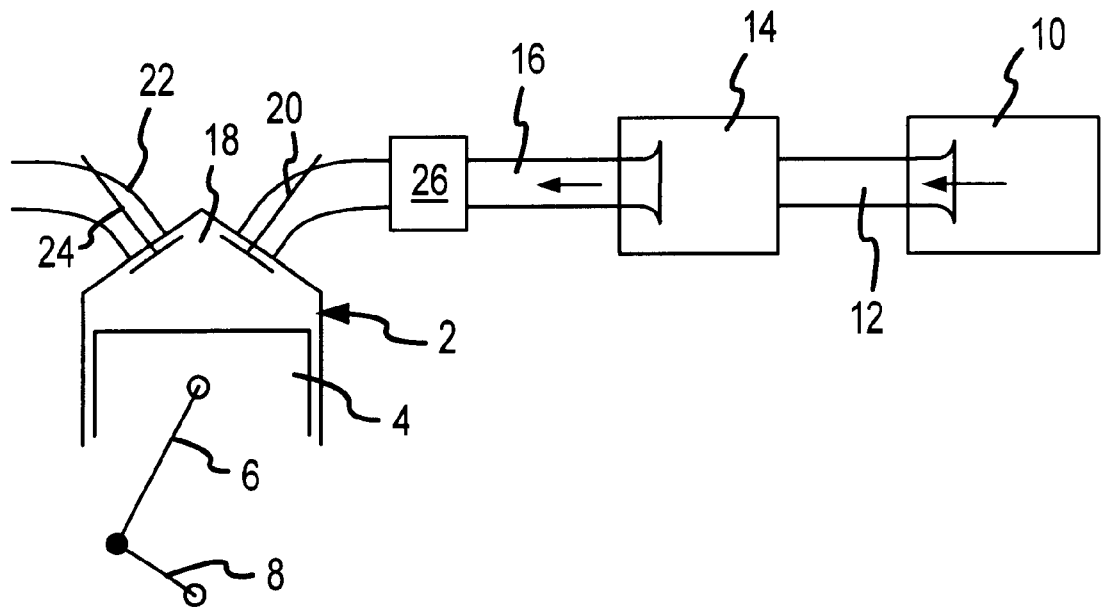
FIG. 1 is a schematic view of a cylinder of a stroke piston combustion engine and showing several components of an induction system thereof.

Referring to FIG. 1, a stroke piston combustion engine has a plurality of cylinders 2, each of which has a piston 4 operating therein which is coupled via a piston rod 6 to a crankshaft 8.

The introduction of fresh air into a cylinder 2 is effected along a path passing through an air filter 10 which is communicated via a coupling 12 with an air collector 14. Individual coupling ducts 16 branch from the air collector 14 to conduct air from the air collector 14 to the combustion chambers 18 of the cylinders 2. An inlet valve 20 is disposed in the outlet end of each coupling duct 16 which communicates with the respective combustion chamber 18. An exhaust valve 24 is disposed in each exhaust duct 22 which is communicated with a respective one of the combustion chambers 18.

The operation of a combustion engine, including an engine having a combustion mixture preparation assembly, is conventionally known and will not be described herein in further detail. In connection with the embodiment of the induction system described herein, the length of a coupling duct 16 is selected in correspondence with a desired range of revolutions per unit time, whereby a particularly good induction can be achieved. The length of a coupling duct 16 can be adjustable or changeable through appropriate intake duct arrangements.

Figure 2:
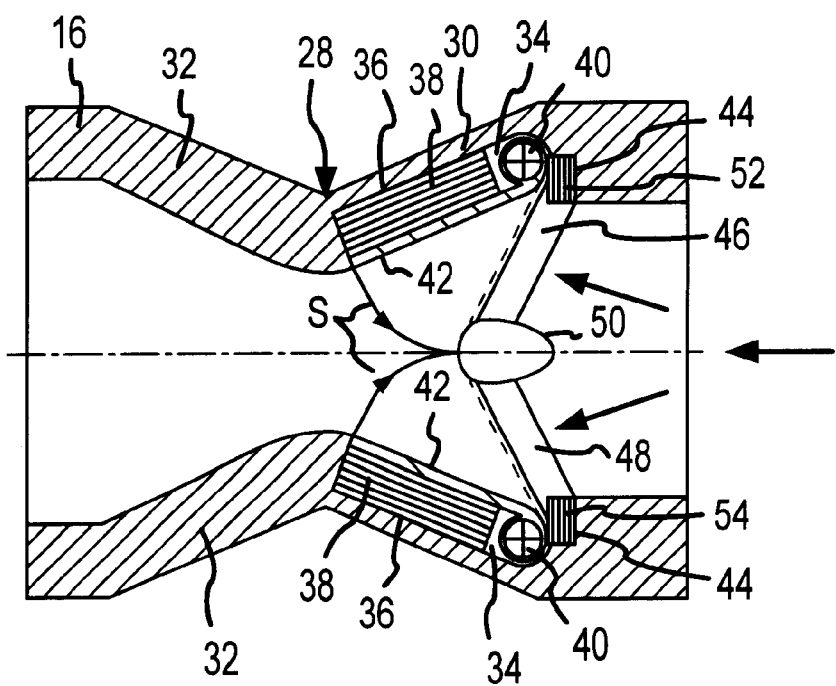
FIG. 2 is a longitudinal cross sectional view of a portion of a coupling duct of the induction system having the apparatus of the present invention.

With reference to FIG. 2, the coupling duct 16 is provided with an apparatus for impulse charging, generally designated as 26.

As seen in FIG. 2, the coupling duct 16 is provided with a Ventura-type restrictor 28 such that the flow through cross section of the coupling duct is reduced or restricted in a region 30 and is expanded in a region 32. In correspondence with the configuration of the restrictor 28, the flow through cross section downstream of the restrictor 28 may be greater than the flow through cross section upstream of the restrictor 28.

A pair of diametrically opposed recesses 34 are provided in the reducing region 30 of the inner surface of the wall of the coupling duct 16, each recess 34 for retaining therein a magnetic core 36 having a respective winding 38.

A pivot rod 40 is disposed in the upstream end of each respective recess 34 and a flap 42 is mounted on each pivot rod 40 for pivoting movement thereabout.

Frame elements 46 and 48 are disposed in correspondingly configured cut outs 44 of the recesses 34 immediately upstream of the pivot pins 40. The outermost extents of the frame elements 46 and 48 are received in the wall of the coupling duct 16 and the innermost extents of the frame elements are disposed adjacent one another at a cross element 50 which extends transversely across the coupling duct and is configured with a streamlined profile such that it offers only a relatively small drag on the flow moving from right to left (as viewed in FIG. 2).

Each frame element 46 and 48, which are preferably formed of a slightly magnetic material, has a magnet winding 52 and 54, respectively, whereby a total of two port magnets are formed which form the flow cross section of the respective coupling duct 16 or inlet channel.

The flaps are configured as soft iron plates which are deformable such that the flaps, in their respective closed positions (shown in broken lines), are disposed in flow preventing relationship to the pole surfaces of the magnet windings 52 and 54 formed by the frame elements 46 and 48. In this manner, relatively large retaining forces are produced and the space to the left of the flaps 42 as viewed in FIG. 2 is reliably secured against flow with respect to the space to the right of the flaps.

The flaps 42 are resiliently biased into their closed positions by means of tension springs or closure springs (not shown) each of which is supported on the wall of the coupling duct for biasing a flap and is, for example, coiled around a pivot rod 40.

The induction system operates in the following manner, starting from a disposition in which the inlet valve 20 is closed and in which there is no flow through the coupling duct 16 in the direction of the inlet valve 20. The flaps 42 are biased by the action of the closure springs (not illustrated) into sealing disposition with the port magnets 46, 52 or, respectively, the port magnets 48, 54, and the flaps are retained in their sealing dispositions due to the magnetic action of the port magnets, whereby the flaps function as magnetic anchors.

If during an intake stroke of the piston the inlet valve 20 is opened, an increasing underpressure is created in the region of the coupling duct 16 downstream of the closed flaps. The energization of the magnet windings 52 and 54 is stopped as a function of the desired charging or other desired thermodynamic parameter whereupon the flaps 42 move relatively rapidly toward their open position under the influence of the underpressure and the flow thereagainst of the air. The slightly magnetic flaps are attracted by the magnet windings 38, which have been energized in correspondence with the movement of the flaps from their closed positions, and the flaps are retained in position against the magnet cores 36, whereby the flaps are reliably retained in their open positions and do not hinder the inlet flow. The inlet flow is sharply accelerated due to the now decreasing underpressure and this effects, therefore, a high impulse charging into the combustion chamber 18.

Upon the closing of the inlet valve 20 in correspondence with the execution of the compression stroke of the piston, the energization of the magnet windings 38 is stopped and the flaps 42 then are biased by the action of the closure springs to move in the closing direction indicated by the arrow s to return to their closed positions, whereupon the cycle can begin again.

If no charging is desired, the flaps can advantageously be retained for a selected duration in their open positions by the energized magnet windings 38 such that the flaps will not form any hindrance to the inlet flow. Alternatively, the magnet windings can be non-energized such that the flaps are free to prevent backflow and to move into their open positions upon contact by an inlet flow.

As a consequence of a relatively modest movement amplitude of the flaps, it is advantageous to form the extents of the flaps in the direction along the pivot rods 40 substantially larger than the extents of the flaps perpendicular to the direction of the pivot rods 40. In this configuration, as viewed from the right in FIG. 2, the frame elements 46 and 48 form an eyeglass frame which is relatively flat and wide. Although the electronic control apparatus for controlling the induction system and energization of the magnet windings and the requisite sensors are not illustrated, the control apparatus can be integrated with a motor control device or be configured as an independent control device.

The control of the flaps 42 is preferably undertaken such that, in certain load conditions of the engine such as, for example, low revolutions per unit time, the flaps 42 have already been controlled to move into their closed positions as the time for completing an intake step approaches and before the inlet valve has been closed. In this manner, a backflow of fresh air through the coupling duct 16 can be reliably prevented.

The coupling duct, as seen in FIG. 2, can be so configured that the free downstream flow cross section (the left end as viewed in FIG. 2) is greater than the free upstream flow cross section (the right end as viewed in FIG. 2).

Figure 3:
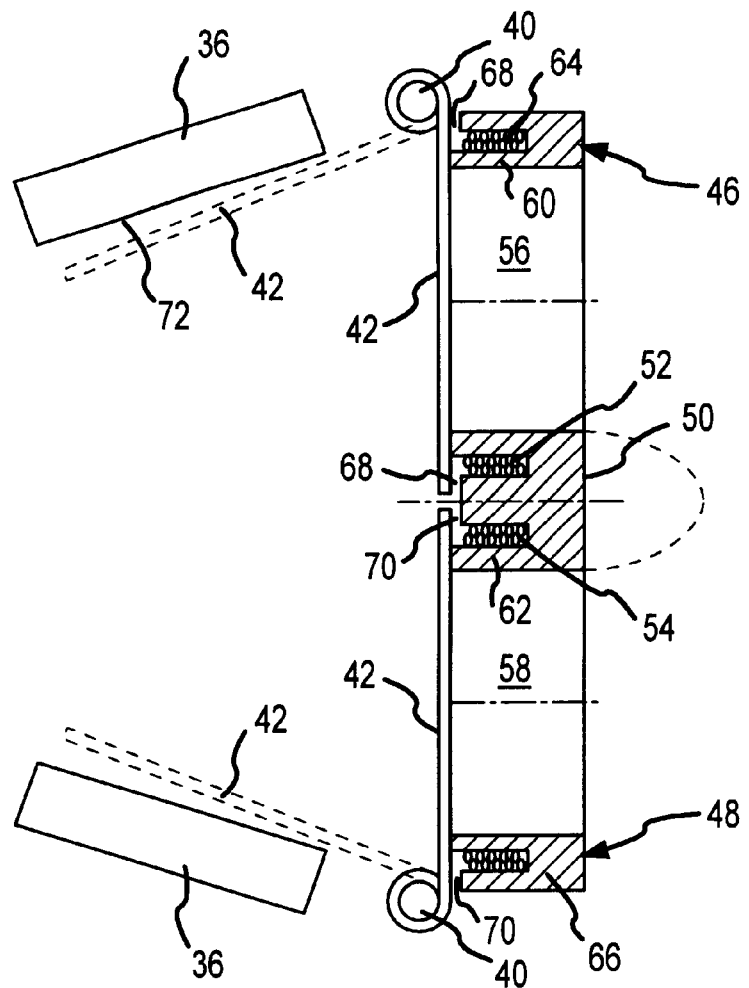
FIG. 3 is longitudinal cross sectional view of a portion of a coupling duct of the induction system having another variation of the apparatus of the present invention which operates in a similar manner to the apparatus shown in FIG. 2.

FIG. 3 illustrates another variation of the induction system of the present invention which operates in substantially the same manner as the induction system illustrated in FIG. 2 but which differs in its configuration in that the cross element 50 is not, relative to the pivot rods 40, offset in the direction of the inlet valve.

As seen in FIG. 3, the flaps 42 in this variation of the induction system are formed as simple thin sheet pieces formed, for example, of soft iron or other material having good magnetic properties, and the flaps are disposed in their operating positions by virtue of being bent around the pivot rods 40.

The frame elements 46 and 48, which frame the flow through openings 56 and 58 of the coupling duct 16 (see FIG. 2), have U-shaped cross sections comprised of an inner peripheral flank 60, 62, respectively, and an outer peripheral flank 64, 66, respectively. Magnet windings 52, 54 are disposed, respectively, in the space defined between the inner peripheral flank 60, 62, respectively, and the outer peripheral flank 64, 66, respectively, of the frame elements 46 and 48.

As can be seen, the outer peripheral flank 64, 66 extends relatively less than the respective inner peripheral flank 60, 62 such that, in the sealing disposition of the flaps 42 on the frame elements 46 and 48, a peripheral air space 68, 70, respectively, is formed. The peripheral air space 68, 70 is of advantage in two respects. Firstly, an advantage is obtained in that there is a shortening in the so-called closure time which has a duration from the de-energization of the windings 52, 54 to the release of the flaps 42 which occurs after a certain reduction in the magnetic attraction. In this manner, the precision with which the opening of the flaps are controlled can be improved. Secondly, the peripheral air space provides a certain damping effect with respect to the closing movement of the flaps in that, before the contact of the flaps against the magnetized surfaces of the inner peripheral flanks 60, 62, air must forced from the area of the magnet windings through the peripheral air space.

A further advantage of the unequal extents of the inner and outer peripheral flanks is that the sealing disposition of the deformable, thin flap sheets and the magnetized surfaces of the inner peripheral flanks 60, 62 is improved.

FIG. 3 shows, in broken lines, an instantaneous position of the upper one of the flaps 42 shortly before the flap has completed its movement into its fully open position. The lower one of the flaps 42 is shown in its fully open position. As can be seen with respect to the upper one of the flaps 42 shown in FIG. 3, the flap must, before it seats into its fully open position in contact with the opening magnets, drive out the air which is present in the air space 72 between the flap and the opening magnet core 36. Consequently, the impact of the flap on the opening magnet is damped.

Figure 4:
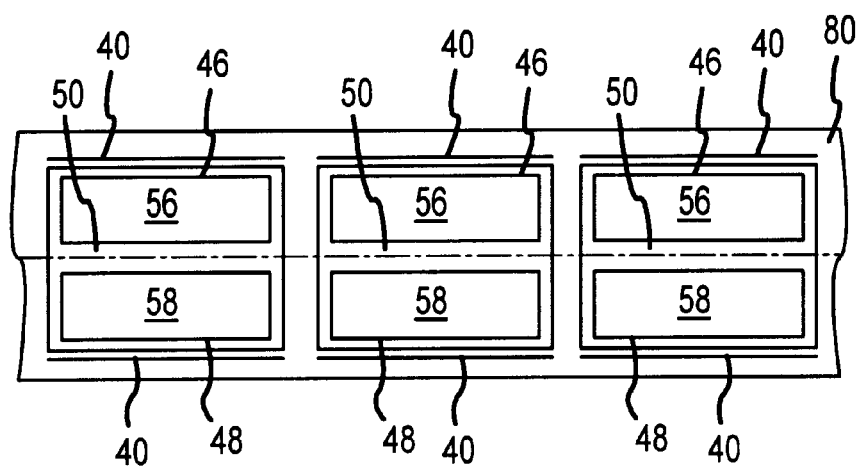
FIG. 4 is front elevation view of a portion of an intake component of the induction system.

FIG. 4 schematically illustrates the arrangement of the flaps 42, as viewed from the left in FIG. 3, wherein an assembly 80 which can, for example, extend along a row of cylinders, is capable of receiving several coupling ducts. FIG. 1 illustrates that the assembly 80 can comprise a side of the apparatus for impulse charging 26 with which the coupling ducts 16 are communicated.

It can be clearly seen that the flow through openings 56 and 58 of each coupling duct, which are encircled by the frame elements 46 and 48, have their respective adjacent extents mutually disposed at the cross elements 50. The pivot rods 40 are disposed in their respective dispositions above and below the frame elements with a respective flap (not shown in FIG. 4) being pivotally mounted to each pivot rod.

The apparatus of the present invention is preferably so configured that, with reference to the entire extent of the coupling duct 16 shown in FIG. 1,—that is, the extent between the inlet valve and the interface of the coupling duct at the air collector—the spacing between the flaps and the inlet valve is in the range of between about 15 to 40% of the entire extent. The inlet valve side of the flaps (the left side as viewed in FIG. 2) is preferably unambiguously disposed in advance of the narrowest location of the restrictor 28 in order to ensure that the flaps, in their open positions, do not interfere with the flow.

It is to be understood that the configuration of the apparatus of the present invention can be modified in numerous ways. The structure of the coupling ducts having the Venturi-type restrictor is not mandatory. Instead of two flaps, a single flap can be provided or a plurality of flaps can be provided distributed around the periphery. Moreover, other exhaust arrangements can be provided in lieu of that shown in FIG. 1, whereby the arrangement shown in FIG. 1 may be particularly simple.

The present invention provides numerous advantages:

As a result of the precipitous opening of the flaps 42, the full cross section of the coupling duct or, respectively, of the inlet valve is relatively suddenly available, whereby a high impulse flow is induced by the underpressure. The attained loading or charging or, alternatively, the attained filling of the cylinder, is thus independent of the revolutions per unit time of the engine—in other words, these cylinder charging or filling performances are available as well during relatively very low revolutions per unit time of the engine. The time at which the flaps 42 open can be tailored to the respective geometric parameters, the revolutions per unit time, and so forth such that a maximum loading of the cylinder is obtained.

In order that the flaps are immediately deployed as magnetic anchors and the respective cross section or cross sections through the port magnets are formed, it is only necessary that there be a small electrical energization to reliably retain the flaps in a sealing disposition.

The opening magnet windings 38 with the associated magnet cores 36 are preferably so configured that their magnetic fields extend into the interior of the coupling ducts 16 in order that the flaps, as they move into their open positions in which they form magnet anchors with these magnetic elements, are reliably magnetically attracted to the magnetic elements and retained thereagainst in their open positions.

The energy of the flow which is being controlled to pass through the ducts is also used in an immediate manner to assist in opening the flaps so that no additional external energy is required and a rapid opening is assured. The energy required for closing the flaps is derived from the energy expended in the opening of the flaps, which is stored as potential energy in the closure springs. The contact of the flaps on the magnetically active surfaces of the magnets can be damped by use of the compressibility properties of the inflowing air, whereby the damping contributes to a reduction in noise and improves longevity.

With regard to the positioning of the flaps, no particular precision is required; in contrast, the positioning can be performed in a relatively accommodating manner or in a manner permitting some free play since no geometric alignment is demanded and the flaps, during their contact with the magnetically active surfaces of the magnets, are only slightly deformed.

The present invention has been described with respect to an especially advantageous embodiment. The flaps can also be activated in a pneumatic, electrical, hydraulic, or other suitable manner and can be formed in other ways of other types of materials.

The method and apparatus of the present invention can be implemented for all types of engines independent of whether or not a plurality of inlet- and exhaust-valves have been provided for each cylinder, whether or not the engine is an Otto cycle engine, a diesel engine, an induction engine, a charged engine, an engine with a single cylinder, or an engine with a plurality of cylinders.

What is claimed is:

1. A method for impulse charging an internal combustion engine having a charging duct whose cross section is available for flow therethrough while an inlet valve communicating the charging duct with a cylinder is in an open position and the charging duct is closeable by means of a closure element during an intake movement of a piston in the cylinder, comprising the steps of:

disposing the closure element in a closed position;

maintaining the closure element in its closed position during at least the initial intake movement of the piston in the cylinder during which the inlet valve is open such that an underpressure is created downstream of the closure element relative to the direction of fluid flow from the charging duct to the cylinder; and during the period of the underpressure, starting movement of the closure element from its closed position to an open position depending upon the desired one of a selection of thermodynamic parameters including charging such that the movement of the closure element from its closed position to its open position is facilitated by the underpressure and the fluid flow starting with opening of the closure element, whereby charging of the cylinder is increased.

2. A method for impulse charging an internal combustion engine according to claim 1, wherein the closure element is resiliently biased toward its closed position and is retained in its closed position by magnetic force.

3. A method for impulse charging an internal combustion engine according to claim 1, wherein the closure element is retained in its open position by magnetic force.

4. A method for impulse charging an internal combustion engine according to claim 1 and further comprising controlling the closure element to move into its closed position in correspondence with the approaching completion of an intake movement of the piston and before the inlet valve has been closed.

5. An apparatus for impulse charging an internal combustion engine having at least one cylinder in which a piston moves in a stroke movement, a charging duct, an inlet valve for temporarily communicating the charging duct with the cylinder, comprising:

means forming a selectively energizable magnetic surface;

a closure element disposed in the charging duct relative to the means forming a selectively energizeable magnetic surface such that, upon energization of the magnetic surface, the closure element is moved from an open position in which a cross section of the charging duct is available for flow therethrough toward the cylinder to a closed position in which the energized magnetic surface retains the closure element by magnetic force at a disposition in which the closure element reduces the cross section of the charging duct in a manner which substantially prevents the flow of fluid therethrough toward the cylinder, whereby the closure element can be retained in its closed position during at least the initial intake movement of the piston in the cylinder with the inlet valve being open such that an underpressure is created downstream of the closure element relative to the direction of fluid flow from the charging duct to the cylinder and, during this period of the underpressure, the closure element can be released to move from its closed position to its open position by de-energization of the magnetic surface, the movement of the closure element being facilitated by the underpressure and the upstream force of the fluid flow against the closure element which increases in correspondence with the increasingly available larger cross section of the charging duct.

6. An apparatus according to claim 5 wherein the selectively energizeable magnetic surface is disposed within the path of flow from the charging duct to the cylinder and has an overall outer peripheral shape corresponding to the cross section of the charging duct and an inner throughbore for flow therethrough and the closure element is a flap having a shape corresponding to the shape of the selectively energizeable magnetic surface such that the flap is retainable in flow preventing disposition against the selectively energizeable magnetic surface during energization thereof.

7. An apparatus according to claim 6 and further comprising second means forming a selectively energizeable magnetic surface disposed relative to the charging duct for selectively retaining the flap in its open position.

8. An apparatus according to claim 5 wherein the closure element includes a pair of flaps and a cross element extending transversely across the charging duct, one flap being movably mounted to a first location in the charging duct and the other flap being movably mounted to a second location in the charging duct generally diametrically opposed to the first location, the pair of flaps being movable between respective open positions in which each flap is adjacent an inner surface of the charging duct and respective closed positions in which one end of each flap is retained against the cross element.

9. An apparatus according to claim 8 wherein the cross element has a streamlined shape with respect to the flow therepast.

10. An apparatus according to claim 8 wherein the charging duct has a Venturi-type extent having an upstream section of increasingly reduced cross section and a downstream section of increasingly larger cross section and the pair of flaps are disposed upstream of the Venturi-type extent and relative thereto such that the flaps form a portion of the upstream portion of increasingly reduced cross section.

11. An apparatus according to claim 5 wherein the closure element has a radial extent smaller than its axial extent as measured relative to its axis of movement.

12. An apparatus according to claim 5 wherein the selectively energizeable magnetic surface and the closure element are configured and disposed relative to one another such that the movement of the closure element into its retained closed position is damped.

13. An apparatus according to claim 5 wherein the charging duct is a portion of an induction system of the internal combustion engine.

14. An apparatus according to claim 5 and further comprising means for resiliently biasing the closure element into its closed position.

15. An apparatus according to claim 6 wherein the flap is in the form of a deformable sheet having soft iron therein, the flap being deformable against the selectively energizeable magnetic surface to prevent flow therepast.

* * * * *